(12) United States Patent
Damgaard et al.

(10) Patent No.: US 6,516,184 B1
(45) Date of Patent: Feb. 4, 2003

(54) MULTI-BAND TRANSCEIVER HAVING MULTI-SLOT CAPABILITY

(75) Inventors: Morten Damgaard, Laguna Hills, CA (US); J. L. Julian Tham, San Jose, CA (US)

(73) Assignee: Skyworks Solutions, Inc., Newport Beach, CA (US)

( * ) Notice: Subject to any disclaimer, the term of this patent is extended or adjusted under 35 U.S.C. 154(b) by 0 days.

(21) Appl. No.: 09/387,038

(22) Filed: Aug. 31, 1999

(51) Int. Cl.[7] ................................................ H04B 1/40
(52) U.S. Cl. ........................................ 455/86; 375/295
(58) Field of Search ............................... 455/76, 86, 78, 455/550, 553, 552; 370/277, 280, 276, 278; 375/295, 303, 219, 272, 273, 274, 275, 277, 278

(56) References Cited

U.S. PATENT DOCUMENTS

| | | | | |
|---|---|---|---|---|
| 5,276,915 A | * | 1/1994 | Marko et al. | 455/86 |
| 5,319,799 A | * | 6/1994 | Morita | 455/78 |
| 5,519,885 A | * | 5/1996 | Vaisanen | 455/76 |
| 5,706,310 A | * | 1/1998 | Wang et al. | 375/296 |
| 5,715,520 A | * | 2/1998 | Hillock et al. | 455/76 |
| 5,727,020 A | * | 3/1998 | Taylor et al. | 375/222 |
| 6,005,443 A | * | 12/1999 | Damgaard et al. | 331/14 |
| 6,150,890 A | * | 11/2000 | Damgaard et al. | 331/14 |
| 6,208,875 B1 | * | 3/2001 | Damgaard et al. | 455/552 |
| 6,356,770 B1 | * | 3/2002 | Ishida | 455/553 |

FOREIGN PATENT DOCUMENTS

| | | | |
|---|---|---|---|
| EP | 0893887 | * | 1/1999 |
| EP | 0 893 887 A2 | | 1/1999 |
| WO | WO 99/25076 | * | 5/1999 |

* cited by examiner

*Primary Examiner*—Nay Maung
*Assistant Examiner*—Joy K. Contee
(74) *Attorney, Agent, or Firm*—Procopio, Cory, Hargreaves & Savitch, LLP

(57) ABSTRACT

A multi-band transceiver for receiving and transmitting signals within selected GSM frequency bands. Transmission and reception occurs simultaneously and within the same time slot of a TDMA frame. The transceiver includes a first local oscillator LO1 that selectively oscillates within a bandwidth corresponding to the selected GSM band and outputs a signal having a frequency $f_{LO1}$. A second local oscillator LO2 selectively oscillates at a frequency corresponding to the selected GSM band and outputs a signal having a frequency $f_{LO2}$. A receiver receives a signal having a frequency $f_{Rx}$ and mixes the signals from the first and second local oscillators to generate a demodulating signal having a frequency $f_{Rx}$, wherein $f_{Rx}=f_{LO1}\pm f_{LO2}$. A transmitter having a loop architecture includes a VCO that generates a signal having a transmit frequency $f_{Tx}$ equal to $f_{Rx}$ minus a comparison frequency $f_{CF}$, and a mixer that mixes the signal from the first local oscillator with the transmit signal to generate an IF signal having a frequency $f_{IF}=f_{LO2}\pm f_{CF}$. A quadrature mixer that modulates the IF signal with baseband "I" and "Q" signals, and a phase detector that compares the phases of the IF signal and the signal from the second local oscillator and outputs a control voltage to the VCO.

39 Claims, 12 Drawing Sheets

|  | GSM | DCS |
|---|---|---|
| Rx Bandwidth | 925-960 MHz | 1805-1880 MHz |
| Tx Bandwidth | 880-915 MHz | 1710-1785 MHz |
| LO1 Bandwidth | 1375-1410 MHz | 1330-1405 MHz |
| LO2 Frequency | 450 MHz | 475 MHz |
| $f_{Rx}$ | $f_{LO1} - f_{LO2}$ | $f_{LO1} + f_{LO2}$ |
| $f_{CF}$ | 45 MHz | 95 MHz |
| $f_{IF}$ | $f_{LO2} + f_{CF} = 495$ MHz | $f_{LO2} - f_{CF} = 380$ MHz |
| M | $f_{IF}/f_{CF} = 11$ | $f_{IF}/f_{CF} = 4$ |
| N | $f_{LO2}/f_{CF} = 10$ | $f_{LO2}/f_{CF} = 5$ |

*Figure 9*

MULTI-BAND TRANSCEIVER HAVING MULTI-SLOT CAPABILITY

FIELD OF THE INVENTION

The present invention relates generally to radio or wireless communications and, more particularly, relates to a transceiver capable of simultaneously receiving and transmitting signals over at least two bands.

BACKGROUND OF THE INVENTION

Wireless communication systems are an integral component of the ongoing technology revolution. Mobile radio communication systems, such as cellular telephone systems, are evolving at an exponential rate. In a cellular system, a coverage area is divided into a plurality of "cells". A cell is the coverage area of a base station or transmitter. Low power transmitters are utilized, so that frequencies used in one cell can also be used in cells that are sufficiently distant to avoid interference. Hence, a cellular telephone user, whether mired in traffic gridlock or attending a meeting, can transmit and receive phone calls so long as the user is within a "cell" served by a base station.

Mobile cellular systems were originally developed as analog systems. After their introduction for commercial use in the early 1980s, mobile cellular systems began to experience rapid and uncoordinated growth. In Europe, for example, individual countries developed their own systems. Generally, the systems of individual countries were incompatible, which constricted mobile communications within national boundaries and restricted the market for mobile equipment developed for a particular country's system. In 1982, in order to address this growing problem, the Conference of European Posts and Telecommunications (CEPT) formed the Groupe Spéciale Mobile (GSM) to study and develop a set of common standards for a future pan-European cellular network. It was recommended that two blocks of frequencies in the 900 MHz range be set aside for the system. The initial goals for the new system included international roaming ability, good subjective voice quality, compatibility with other systems such as the Integrated Services Digital Network (ISDN), spectral efficiency, low handset and base station costs, and the ability to support new services and a high volume of users.

One of the initial, major decisions in the development of the GSM standard was adoption of a digital, rather than an analog, system. As mentioned above, analog systems were experiencing rapid growth and the increasing demand was straining the capacity of the available frequency bands. Digital systems offer improved spectral efficiency and are more cost efficient. The quality of digital transmission is also superior to that of analog transmission. Background sounds such as hissing and static and degrading effects such as fadeout and cross talk are largely eliminated in digital systems. Security features such as encryption are more easily implemented in a digital system. Compatibility with the ISDN is more easily achieved with a digital system. Finally, a digital approach permits the use of Very Large Scale Integration (VLSI), thereby facilitating the development of cheaper and smaller mobile handsets.

In 1989, the European Telecommunications Standards Institute (ETSI) took over responsibility for the GSM standards. In 1990, phase I of the standard was published and the first commercial services employing the GSM standard were launched in 1991. It was also renamed in 1991 as the Global System for Mobile Communications (still GSM). After its early introduction in Europe, the standard was elevated to a global stage in 1992 when introduced in Australia. Since then, GSM has become the most widely adopted and fastest growing digital cellular standard, and is positioned to become the world's dominant cellular standard. With (currently) 324 GSM networks in operation in 129 countries, GSM provides almost complete global coverage. As of January 1999, according to the GSM Memorandum of Understanding Association, GSM accounted for more than 120 million subscribers. Market research firms estimate that by 2001, there will be more than 250 million GSM subscribers worldwide. At that time, GSM will account for almost 60% of the global cellular subscriber base, with yearly shipments exceeding 100 million phones.

Two frequency bands of 25 MHz were allocated for GSM use. As illustrated in FIG. 1a, the 890–915 MHz band is reserved for transmission or "uplink" (mobile station to base station), and the 935–960 MHz band is reserved for reception or "downlink" (base station to mobile station). An extra ten MHz of bandwidth was later added to each frequency band. The standard incorporating this extra bandwidth (two 35 MHz bands) is known as Extended GSM (EGSM). In EGSM, the transmission band covers 880–915 MHz and the receiving band covers 925–960 MHz (FIG. 1b). The terms GSM and EGSM are used interchangeably, with GSM sometimes used in reference to the extended bandwidth portions (880–890 MHz and 925–935 MHz). Sometimes, the originally specified 890–915 MHz and 935–960 MHz bands are designated Primary GSM (PGSM). In the following description, GSM will be used in reference to the extended bandwidth (35 MHz) standard.

Due to the expected widespread use of GSM, capacity problems in the 900 MHz frequency bands were anticipated and addressed. ETSI had already defined an 1800 MHz variant (DCS or GSM 1800) in the first release of the GSM standard in 1989. In DCS, the transmission band covers 1710–1785 MHz and the receiving band covers 1805–1880 MHz (FIG. 1c). In the United States, the Federal Communications Commission (FCC) auctioned large blocks of spectrum in the 1900 MHz band, aiming to introduce digital wireless networks to the country in the form of a mass market Personal Communication Service (PCS). The GSM service in the US is known as PCS or GSM 1900. In PCS, the transmission band covers 1850–1910 MHz and the receiving band covers 1930–1990 MHz (FIG. 1d).

Regardless of which GSM standard is used, once a mobile station is assigned a channel, a fixed frequency relation is maintained between the transmit and receive frequency bands. In GSM (900 MHz), this fixed frequency relation is 45 MHz. If, for example, a mobile station is assigned a transmit channel at 895.2 MHz, its receive channel will always be at 940.2 MHz. This also holds true for DCS and PCS; the frequency relation is just different. In DCS, the receive channel is always 95 MHz higher than the transmit channel and, in PCS, the receive channel is 80 MHz higher than the transmit channel.

The architecture of one implementation of a GSM network 20 is depicted in block form in FIG. 2. GSM network 20 is divided into four interconnected components or subsystems: a Mobile Station (MS) 30, a Base Station Subsystem (BSS) 40, a Network Switching Subsystem (NSS) 50 and an Operation Support Subsystem (OSS) 60. Generally, MS 30 is the mobile equipment or phone carried by the user; BSS 40 interfaces with multiple MSs 30 and manages the radio transmission paths between the MSs and NSS 50; NSS 50 manages system switching functions and facilitates communications with other networks such as the PSTN and the ISDN; and OSS 60 facilitates operation and maintenance of the GSM network.

Mobile Station 30 comprises Mobile Equipment (ME) 32 and Subscriber Identity Module (SIM) 34. ME 32 is typically a digital mobile phone or handset. SIM 34 is a memory device that stores subscriber and handset identification information. It is implemented as a smart card or as a plug-in module and activates service from any GSM phone. Among the information stored on SIM 34 are a unique International Mobile Subscriber Identity (IMSI) that identifies the subscriber to system 20, and an International Mobile Equipment Identity (IMEI) that uniquely identifies the mobile equipment. A user can access the GSM network via any GSM handset or terminal through use of the SIM. Other information, such as a personal identification number (PIN) and billing information, may be stored on SIM 34.

MS 30 communicates with BSS 40 across a standardized "Um" or radio air interface 36. BSS 40 comprises multiple base transceiver stations (BTS) 42 and base station controllers (BSC) 44. A BTS is usually in the center of a cell and consists of one or more radio transceivers with an antenna. It establishes radio links and handles radio communications over the Um interface with mobile stations within the cell. The transmitting power of the BTS defines the size of the cell. Each BSC 44 manages multiple, as many as hundreds of, BTSs 42. BTS-BSC communication is over a standardized "Abis" interface 46, which is specified by GSM to be standardized for all manufacturers. The BSC allocates and manages radio channels and controls handovers of calls between its BTSs.

The BSCs of BSS 40 communicate with network subsystem 50 over a GSM standardized "A" interface 51. The A interface uses an SS7 protocol and allows use of base stations and switching equipment made by different manufacturers. Mobile Switching Center (MSC) 52 is the primary component of NSS 50. MSC 52 manages communications between mobile subscribers and between mobile subscribers and public networks 70. Examples of public networks 70 that MSC 52 may interface with include Integrated Services Digital Network (ISDN) 72, Public Switched Telephone Network (PSTN) 74, Public Land Mobile Network (PLMN) 76 and Packet Switched Public Data Network (PSPDN) 78.

MSC 52 interfaces with four databases to manage communication and switching functions. Home Location Register (HLR) 54 contains details on each subscriber residing within the area served by the MSC, including subscriber identities, services to which they have access, and their current location within the network. Visitor Location Register (VLR) 56 temporarily stores data about roaming subscribers within a coverage area of a particular MSC. Equipment Identity Register (EIR) 58 contains a list of mobile equipment, each of which is identified by an IMEI, which is valid and authorized to use the network. Equipment that has been reported as lost or stolen is stored on a separate list of invalid equipment that allows identification of subscribers attempting to use such equipment. The Authorization Center (AuC) 59 stores authentication and encyrption data and parameters that verify a subscriber's identity.

OSS 60 contains one or several Operation Maintenance Centers (OMC) that monitor and maintain the performance of all components of the GSM network. OSS 60 maintains all hardware and network operations, manages charging and billing operations and manages all mobile equipment within the system.

The GSM transmitting and receiving bands are divided into 200 kHz carrier frequency bands. Using Time Division Multiple Access techniques (TDMA), each of the carrier frequencies is subdivided in time into eight time slots. Each time slot has a duration of approximately 0.577 ms, and eight time slots form a TDMA "frame", having a duration of 4.615 ms. One implementation of a conventional TDMA frame 80 having eight time slots 0–7 is illustrated in FIG. 3a.

In this conventional TDMA framework, each mobile station is assigned one time slot for receiving data and one time slot for transmitting data. In TDMA frame 80, for example, time slot zero has been assigned to receive data and time slot four has been assigned to transmit data. The receive slot is also referred to as the downlink slot and the transmit slot is referred to as the uplink slot. The remaining slots are used for offset, control, monitoring and other operations. This framework permits simultaneous reception by as many as eight mobile stations on one frequency and simultaneous transmission by as many as eight mobile stations on one frequency.

In recently proposed GSM standards (phase 2+), a multi-slot mode of operation is defined. In multi-slot operation, a mobile station transmits and/or receives in several time slots within each TDMA frame (as opposed to the configuration of frame 80, wherein there is only one receive and one transmit timeslot per frame). Two types of mobile stations having multislot capabilities divided into eighteen classes have been defined. A type 1 mobile station is not required to transmit and receive at the same time. An example of a TDMA frame 85 used by a type 1 mobile station having multi-slot capabilities is shown in FIG. 3b. TDMA frame 85 has two receive time slots 0 and 1 and two transmit time slots 3 and 4. Many other receive and transmit slot assignments are, of course, possible. For a type 1 mobile station, though multiple time slots are used to receive and transmit, the mobile station is still not required to transmit and receive within the same time slot.

A type 2 mobile station has the capability to receive and transmit within the same time slot. A TDMA frame 90 suitable for use in conjunction with a type 2 mobile station is illustrated in FIG. 3c. TDMA frame 90 transmits in slots 4–6 and receives in slots 1–4. Hence, a mobile station using this framework would be required to both receive and transmit in slot 4. Generally, as the number of time slots used for receiving and transmitting increases, and as the number of time slots in which both receiving and transmitting occurs increases, the class designation also increases. In the highest class, a class 18 type 2 mobile station, all eight time slots of each TDMA frame are configured to both receive and transmit.

Under current GSM standards using the conventional TDMA framework, the mobile station transmitter and receiver can easily share a frequency resource. In TDMA frame 80, for example, when going from receive mode to transmit mode, there are three time slots during which the required transmit frequency can be generated from a shared frequency resource (i.e. a local oscillator). This provides a great deal of freedom in the transceiver architecture and frequency generation scheme. Under the proposed multi-slot standards, however, there is less flexibility for sharing frequency resources. In the type 1 mobile station framework of FIG. 3b, for example, there is only one time slot available to change from the receive frequency to the transmit frequency. For a type 2 mobile station with multi-slot capability, using a TDMA framework such as that of FIG. 3c, the design challenges are further intensified. The required receive and transmit frequencies must be generated simultaneously.

Moreover, as described above, there are currently three GSM frequency bands defined. With the proliferation of wireless handset usage showing now signs of slowing down, it is likely that additional bands will be defined in the future. Hence, GSM mobile stations intended for global usage should have multi-band capability. A multi-band design magnifies the already substantial challenge of designing a cost efficient transceiver having type 2 multislot capability.

SUMMARY OF THE INVENTION

In accordance with the purpose of the invention as broadly described herein, there is provided a cost-effective, multi-band transceiver that is capable of type 2 multi-slot operation. The transceiver has a frequency generation architecture that permits reception and transmission within the same time slot on any given channel within any of the GSM frequency bands.

In one embodiment of the present invention, a transceiver having simultaneous transmission and reception capability is provided. It comprises a first local oscillator LO1 that generates a signal having a frequency $f_{LO1}$, and a second local oscillator LO2 that generates a signal having a frequency $f_{LO2}$. A receiver receives a signal having a frequency $f_{Rx}$, wherein $f_{Rx}$ is one of the sum or the difference of frequencies $f_{LO1}$ and $f_{LO2}$. The receiver comprises an image rejection mixer that mixes frequencies $f_{LO1}$ and $f_{LO2}$ to generate a demodulating signal at the receive frequency $f_{Rx}$, and a quadrature down converter that mixes the demodulating signal with the receive signal to produce baseband "I" and "Q" signals. A transmitter transmits a signal having a frequency $f_{Tx}$, wherein $f_{Tx}$ is equal to $f_{Rx}$ minus a comparison frequency $f_{CF}$. The transmitter comprises a voltage-controlled oscillator (VCO) that generates the transmit signal, a mixer that mixes the transmit signal with the signal from the first local oscillator LO1 to produce an IF signal having a frequency $f_{IF}$, a quadrature mixer modulates the IF signal with baseband "I" and "Q" signals, a first divider that divides $f_{IF}$ by an integer M down to $f_{CF}$, a second divider that divides $f_{LO2}$ by an integer N down to $f_{CF}$, and a phase detector that compares the phases of the signals output by the first and second dividers and outputs a control voltage to the first VCO.

In another embodiment of the present invention, a multi-band transceiver for receiving and transmitting signals within a selected one of at least two frequency bands is provided. Transmission and reception occurs simultaneously and within the same time slot of a TDMA frame. The transceiver includes a first local oscillator LO1 that selectively oscillates within a bandwidth corresponding to the selected frequency band and outputs a signal having a frequency $f_{LO1}$. A second local oscillator LO2 selectively oscillates at a frequency corresponding to the selected frequency band and outputs a signal having a frequency $f_{LO2}$. A receiver receives a signal having a frequency $f_{Rx}$ and mixes the signals from the first and second local oscillators to generate a demodulating signal having a frequency $f_{Rx}$, wherein $f_{Rx}=f_{LO1}\pm f_{LO2}$. A transmitter having a loop architecture includes a VCO that generates a signal having a transmit frequency $f_{Tx}$ equal to $f_{Rx}$ minus a comparison frequency $f_{CF}$, and a mixer that mixes the signal from the first local oscillator with the transmit signal to generate an IF signal having a frequency $f_{IF}=f_{LO2}\pm f_{CF}$. The transmitter also includes a quadrature mixer that modulates the IF signal with baseband "I" and "Q" signals, and a phase detector that compares the phases of the IF signal and the signal from the second local oscillator and outputs a control voltage to the VCO.

The present invention also provides a method for simultaneously transmitting and receiving signals. The method comprises the following steps:

(a) generating two local oscillation (LO) signals;

(b) receiving a receive signal;

(c) demodulating the receive signal using the LO signals;

(d) generating a transmit signal;

(e) modulating the transmit signal using one of the LO signals;

(f) aligning the phase of the transmit signal using the other of the LO signals; and (g) transmitting the modulated transmit signal.

Steps (a)–(c) are performed repetitively and simultaneously with steps (d)–(g).

In another method according to the present invention, signals are transmitted and received within the same time slot of a TDMA frame. The method comprises the following steps:

(a) generating a first local oscillation signal LO1 having a frequency $f_{LO1}$;

(b) generating a second local oscillation signal LO2 having a frequency $f_{LO2}$;

(c) receiving a receive signal having a frequency $f_{Rx}$;

(d) mixing signals LO1 and LO2 to generate a demodulating signal having a frequency $f_{Rx}$;

(e) mixing the demodulating signal and the receive signal to generate baseband "I" and "Q" signals;

(f) generating a transmit signal having a frequency $f_{Tx}$;

(g) mixing the transmit signal and the LO1 signal to generate an IF signal having a frequency $f_{IF}$;

(h) modulating the IF signal with baseband "I" and "Q" signals;

(i) dividing the frequency of the IF signal $f_{IF}$ down to a comparison frequency $f_{CF}$;

(j) dividing the frequency of the LO2 signal $f_{LO2}$ down to the comparison frequency $f_{CF}$;

(k) comparing the phases of the divided IF and LO2 signals and adjusting the frequency of the transmit signal if necessary; and (l) transmitting the modulated transmit signal.

Objects and advantages of the present invention include any of the foregoing, singly or in combination. Further objects and advantages will be apparent to those of ordinary skill in the art, or will be set forth in the following disclosure.

BRIEF DESCRIPTION OF THE DRAWINGS

The present invention is described with reference to the accompanying drawings. In the drawings, like reference numbers indicate identical or functionally similar elements.

FIG. 9 is a table summarizing the frequency relationships employed by the transceiver of the present invention.

DETAILED DESCRIPTION OF PREFERRED EMBODIMENTS

Figure 1A:
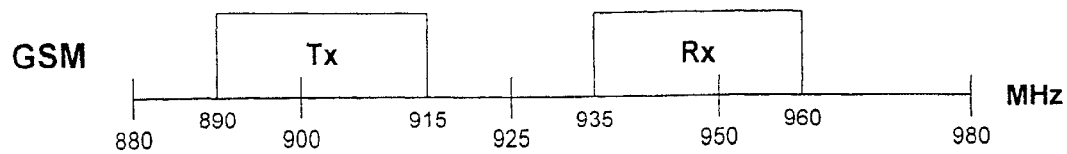
FIG. 1a illustrates the transmit and receive frequency bands under the GSM standard;.
Figure 1B:
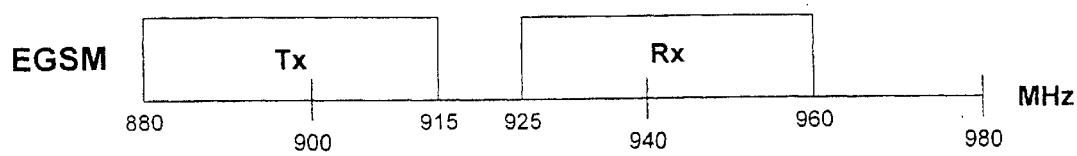
FIG. 1b illustrates the transmit and receive frequency bands under the EGSM standard.
Figure 1C:
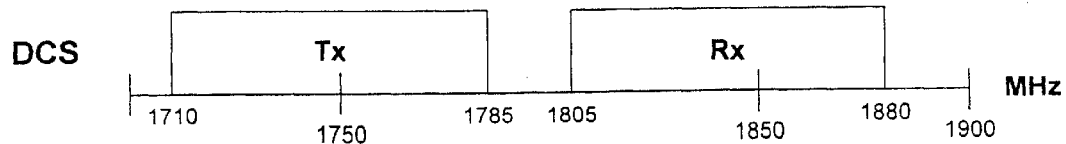
FIG. 1c illustrates the transmit and receive frequency bands under the GSM 1800 ("DCS") standard.
Figure 1D:
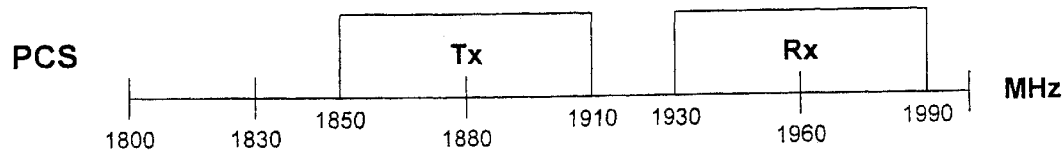
FIG. 1d illustrates the transmit and receive frequency bands under the GSM 1900 ("PCS") standard.
Figure 2:
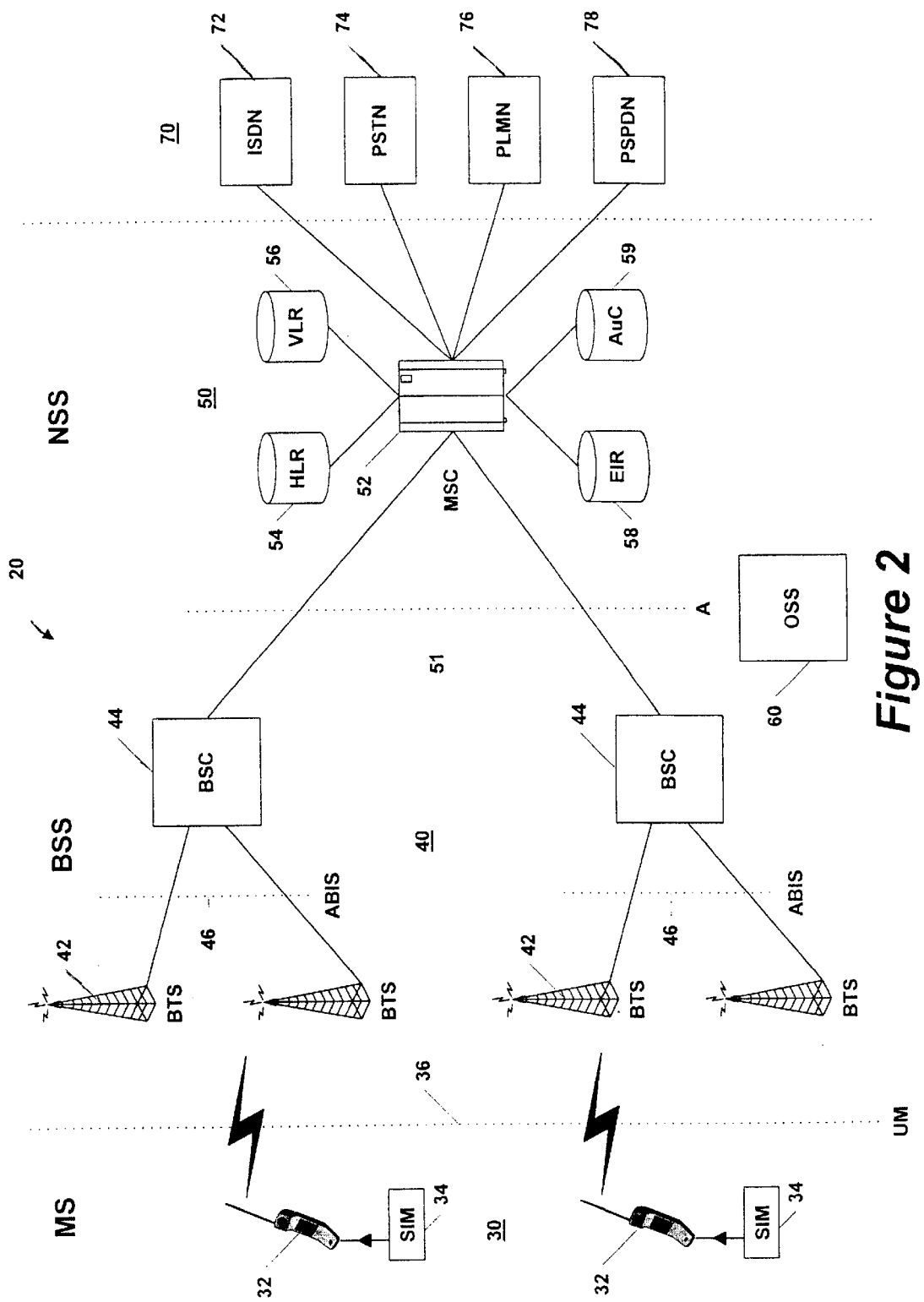
FIG. 2 is a block diagram of an exemplary GSM network.
Figure 3A:
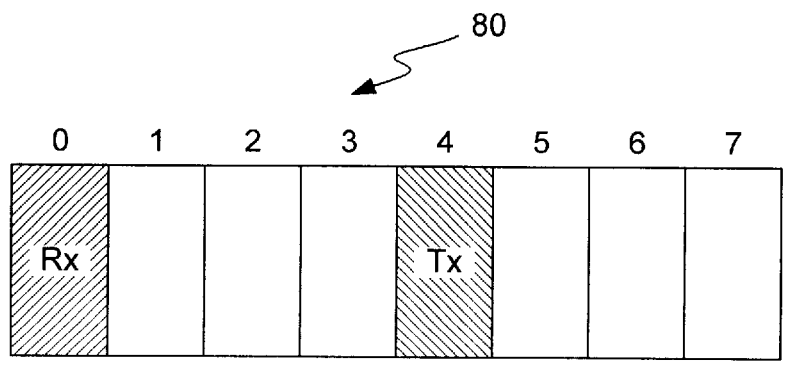
FIG. 3a illustrates the format of a conventional TDMA frame.
Figure 3B:
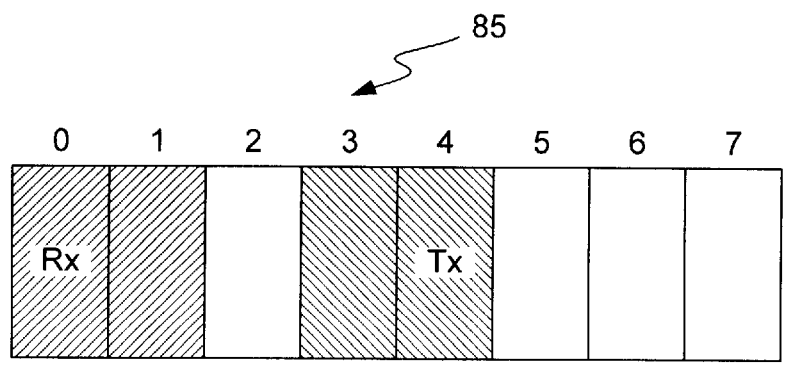
FIG. 3b illustrates the format of a type 1, multi-slot TDMA frame.
Figure 3C:
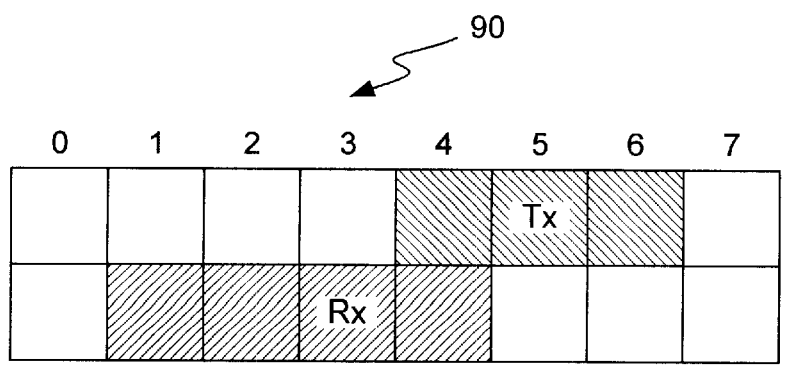
FIG. 3c illustrates the format of a type 2, multi-slot TDMA frame.
Figure 4:
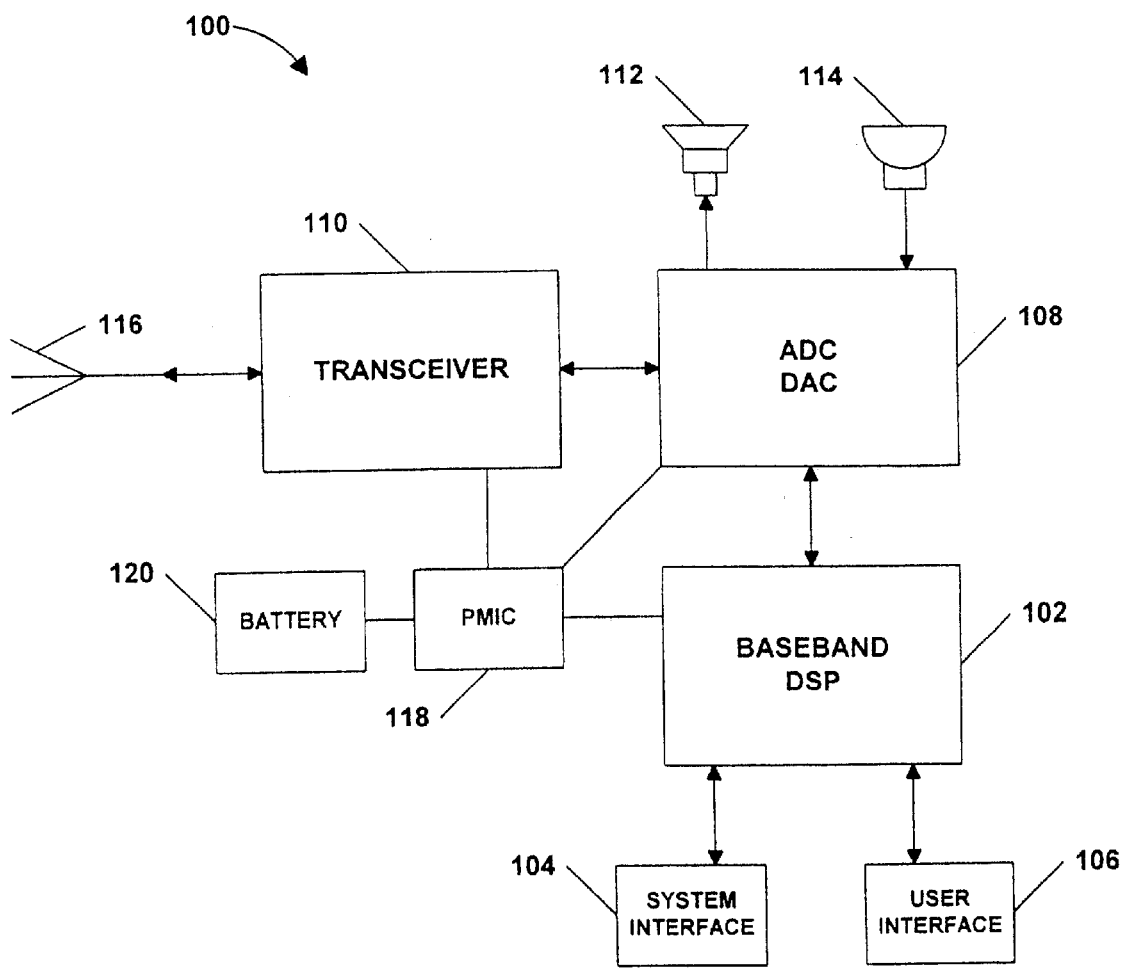
FIG. 4 is a block diagram of a mobile station according to the present invention.

FIG. 4 is a block diagram of one implementation of a mobile, wireless handset 100 incorporating a transceiver according to the present invention. Handset 100 may operate as a mobile station within a GSM network, such as a mobile station 30 within a GSM network 20 as illustrated in FIG. 2. Handset 100 includes a baseband digital signal processor (DSP) 102, typically integrated on a single die. Baseband DSP 102 directs the overall operation of mobile station 30. It processes baseband data received from antenna 116 and transceiver 110 into an audible acoustic signal for announcement over speaker 112. DSP 102 also processes acoustic data received from microphone 114 into baseband data which is provided to transceiver 110 for transmission over antenna 116.

DSP 102 also manages system and user interface tasks via a system interface 104 and a user interface 106. System interface 104 may include suitable means for managing functions such as GSM network and modem access and subscriber services. User interface 106 may include suitable means for inputting and displaying information, such as a keypad, display, backlight, volume control and real time clock. In one implementation, DSP 102 is housed in a 128-pin TQFP and, in another implementation, DSP 102 is housed in a 160-pin 12×12 mm Chip Array Ball Grid Array (CABGA).

In one implementation, baseband DSP 102 interfaces with transceiver 110, speaker 112 and microphone 114 via integrated analog IC 108. IC 108 implements an analog-to-digital converter (ADC), a digital-to-analog converter (DAC) and all signal conversions required to permit interface between DSP 102 and transceiver 110, speaker 112 and microphone 114. Typically, the ADC and DAC will be embodied in a CODEC. Microphone 114 is configured to convert acoustic signals, typically those in the audio band, into analog electric signals. The signals captured by microphone 114 are decoded and digitized by the ADC in IC 108 and processed into baseband I and Q signals by DSP 102. The digital baseband I and Q signals are converted into an analog signal stream by the DAC in IC 108, and are then modulated and transmitted (via antenna 116) by transceiver 110. Conversely, modulated signals captured by antenna 116 are demodulated and converted into analog baseband I and Q signals by transceiver 110, digitized by IC 108, processed by DSP 102, and converted into an analog acoustic signal by IC 108 that is announced by speaker 112. IC 108 may be implemented in a 100-pin TQFP, a 100-pin 10×10 mm CABGA package or in any other suitable housing. A power management IC (PMIC) 118 is coupled to a battery 120 and integrates on a single die all power supply related functions required by handset 100.

Figure 5:
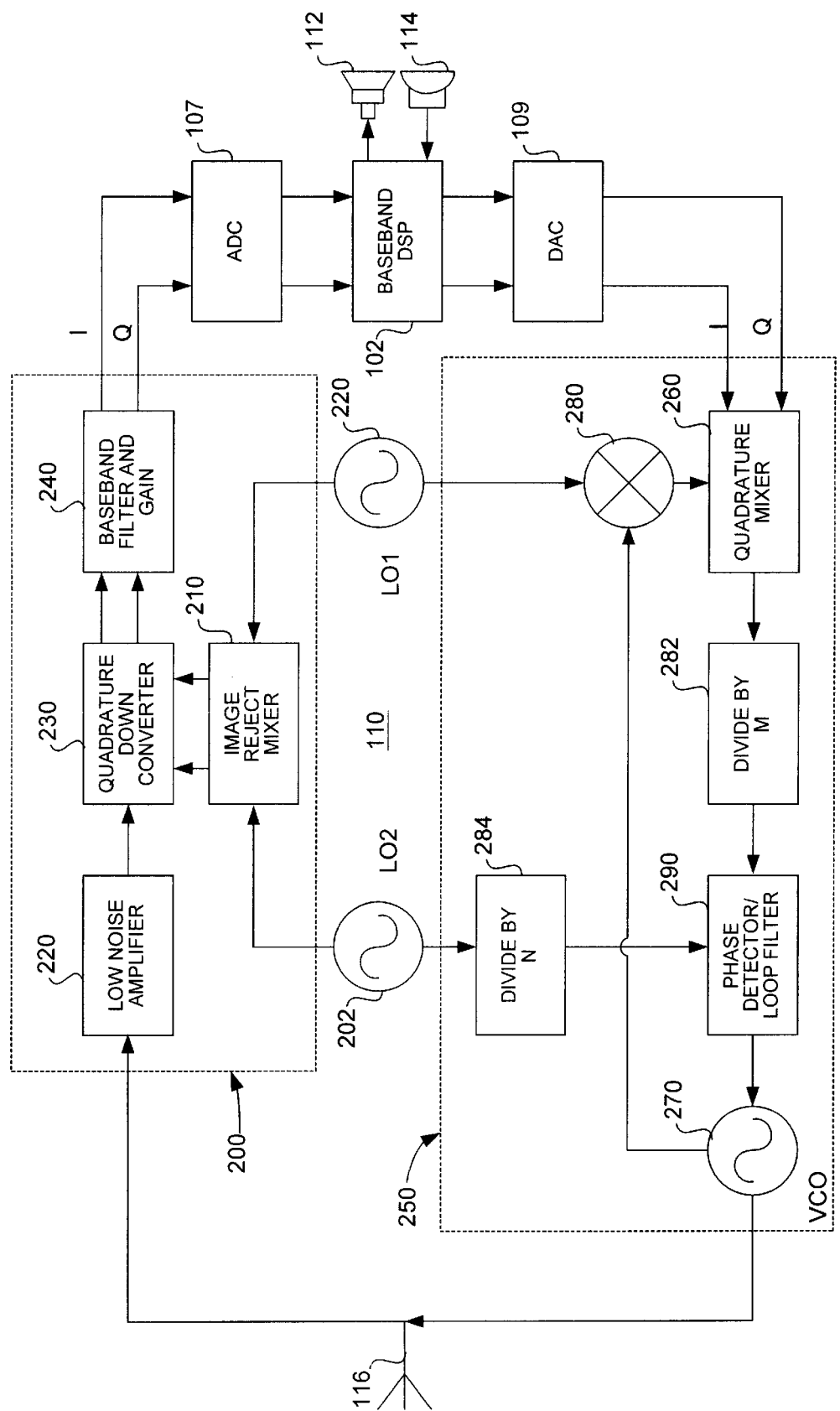
FIG. 5 is a block diagram of a transceiver according to the present invention.

FIG. 5 is a general block diagram of a transceiver 110 according to the present invention. Transceiver 110 comprises a receiver 200, a transmitter 250, and two local oscillators LO1 (201) and LO2 (202). Oscillators LO1 and LO2 are programmable to particular frequency ranges and bandwidths that depend on which GSM bands transceiver 110 is to support. The discussion below describes one implementation of a transceiver that is compatible with the standard GSM band (900 MHz) and the DCS band (1800 MHz). It should be appreciated, however, that this is just one of many possible implementations. In particular, it should be appreciated that oscillators LO1 and LO2 could be programmed to accommodate other combinations of GSM bands, more than two GSM bands, or even to support other (non-GSM) standards. Either, both or neither of oscillators LO1 and LO2 may be situated on-chip with the other components of transceiver 110. In one implementation, the higher frequency oscillator (LO1) is situated off-chip and the lower frequency oscillator (LO2) is situated on-chip.

In the discussion below, "GSM" refers to the extended GSM bands of 880–915 MHz and 925–960 MHz, and "DCS" refers to the bands of 1710–1785 MHz and 1805–1880 MHz. For GSM, LO1 has a 35 MHz bandwidth extending from 1375–1410 MHz. For DCS, LO1 has a 75 MHz bandwidth extending from 1330–1405 MHz. Oscillator LO2 is fixed at a frequency that, again, depends on the desired GSM band. For GSM, LO2 is fixed at 450 MHz. For DCS, LO2 is fixed at 475 MHz. Handset 100 includes means, such as a menu selection or switch, to permit a user to select between the two bands. Once a band is selected, oscillators LO1 and LO2 are set to the appropriate bandwidth and frequency range. As will be explained in detail below, the settings of local oscillators LO1 and LO2, in combination with the architecture of receiver 200 and transmitter 250, permits simultaneous generation of the frequencies necessary for both modulation and demodulation.

The operation of receiver 200 is generally described with reference to FIG. 5. Receiver 200 comprises image reject mixer 210, low noise amplifier (LNA) block 220, quadrature down converter 230 and baseband filter and gain block 240. LNA block 220 receives and amplifies a receive signal having a frequency $f_{Rx}$ from antenna 116 on a selected GSM band. Quadrature down converter 230 demodulates the receive signal with two 90° phase-displaced demodulating signals generated by image reject mixer 210, both at the receive frequency, to produce "I" and "Q" baseband signals. The "I" and "Q" baseband signals are a digital bit sequence that may contain a digitized voice signal or data. The demodulated signals are filtered and amplified by block 240 and input to analog-to-digital (ADC) converter 107. ADC 107 converts the filtered and amplified "I" and "Q" signals to the digital domain for processing by baseband DSP 102. The processed "I" and "Q" signals may be converted into an analog voice signal which is announced by speaker 112.

Figure 6:
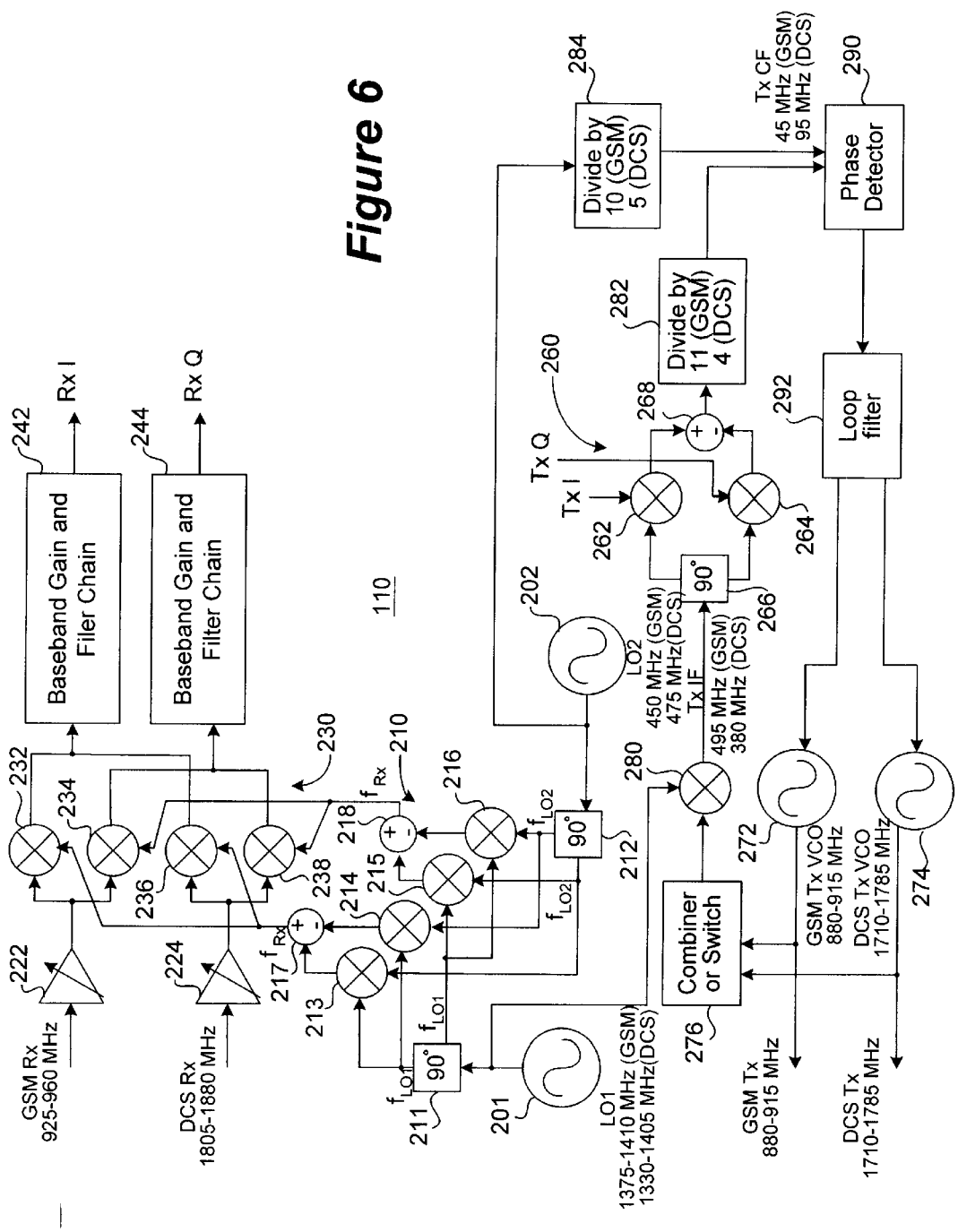
FIG. 6 is a more detailed block diagram of the transceiver of FIG. 5.

Receiver 200 is now described in more detail with reference to FIG. 6. Signals at the receive frequency $f_{Rx}$ received by antenna 116 are input to low noise amplifier (LNA) block 220 (FIG. 5). LNA block 220 comprises a first LNA 222 that receives signals on the GSM band and a second LNA 224 that receives signals on the DCS band (FIG. 6). The LNAs amplify the low level receive signals from antenna 116. Preferably, LNAs 222 and 224 have a low noise figure to prevent addition of excessive noise to weak receive signals and a high intercept point to prevent strong interfering signals from causing interference to the receive signals.

The outputs of LNAs 222 and 224 are input to quadrature down converter 230. Quadrature down converter 230 mixes the receive signal with 90° phase-displaced demodulating signals from image reject mixer 210 to produce two separate signals at baseband (zero) frequency. The baseband signals are referred to as "I" (in-phase) and "Q" (quadrature). The "I" and "Q" signals contain the information that was sent by the transmission source.

Quadrature down converter 230 includes four mixers or demodulators 232, 234, 236 and 238. Mixers 232 and 234, which are active in GSM mode, receive inputs from the output of LNA 222. Mixers 236 and 238, which are active in DCS mode, receive inputs from the output of LNA 224. The in-phase demodulating signal from image reject mixer 210 and the receive signal from one of LNAs 222 and 224, both at the receive frequency $f_{Rx}$, are input to one of "I" demodulators 232 and 236. The active one of mixers 232 and 236 mixes the signals and outputs the "I" baseband signal. Again, only one of mixers 232 and 236 and a corresponding one of LNAs 222 and 224 is active, depending on the GSM band being used. The 90° out-of-phase demodulating signal from image reject mixer 210 and the receive signal from LNAs 222 and 224, both at the receive frequency, are input to "Q" demodulators 234 and 238. The active one of mixers 234 and 238 mixes the signals and outputs the "Q" baseband signal.

The "I" and "Q" baseband signals are input to, respectively, baseband gain and filter chain blocks 242 and 244. Block 242, depending on the GSM band being used, processes the "I" baseband signal from one of mixers 232 and 236, and block 244 processes the "Q" baseband signal from one of mixers 234 and 238. The filter portions of blocks 242 and 244 attenuate undesired interfering signals to a level sufficiently low such that the dynamic range of the ADC is not compromised. They must be capable of operating with high level signals in the stopband and low-level signals in the passband. Since the filters also provide channel selectivity for the receiver, they must have high attenuation at frequencies as close as one channel away from the receive frequency. Blocks 242 and 244 also perform a DC cancellation function to avoid saturation of the amplifier portion. The amplifier portions of blocks 242 and 244 amplify the "I" and "Q" signals to a level appropriate for processing by analog-to-digital converter 108. The amplifiers may have variable gain to maintain the output "I" and "Q" signal levels within the dynamic range of the ADC.

Image reject mixer 210 combines the signals output by oscillators LO1 and LO2 to produce two 90° offset demodulating signals at the receive frequency. The frequency of the demodulating signals output by image reject mixer 210 is either the sum or difference of the LO frequencies while the signal at the image (sum or difference) frequency is suppressed.

For GSM, oscillator LO1 has a frequency range of 1375–1410 MHz and LO2 is set to a fixed frequency of 450 MHz. Image reject mixer 210 outputs a demodulating signal having a frequency equal to the difference between $f_{LO1}$ and $f_{LO2}$, which is also equal to the receive frequency $f_{Rx}$ and is within the GSM receive bandwidth of 925–960 MHz. This relationship is expressed as:

$$f_{Rx} = f_{LO1} - f_{LO2} \text{(GSM)} \quad \text{(equation 1)}.$$

The signal at the image frequency, which is the sum of the two oscillator frequencies ($f_{LO1} + f_{LO2}$), is suppressed by image reject mixer 210.

For DCS, oscillator LO1 has a frequency range of 1330–1405 MHz and LO2 is set to a fixed frequency of 475 MHz. Image reject mixer 210 outputs a demodulating signal having a frequency equal to the sum of $f_{LO1}$ and $f_{LO2}$, which is also equal to the receive frequency $f_{Rx}$ and is within the DCS receive bandwidth of 1805–1880 MHz. This relationship is expressed as:

$$f_{Rx} = f_{LO1} + f_{LO2} \text{(DCS)} \quad \text{(equation 2)}.$$

The signal at the image frequency, which is the difference of the two oscillator frequencies ($f_{LO1} - f_{LO2}$), is suppressed by image reject mixer 210.

Two specific examples, one in each frequency band, are now considered to demonstrate the above relationships. First, in the GSM band, consider a receive signal having a frequency of 950 MHz. The frequency of oscillator LO2 is fixed at $f_{LO2} = 450$ MHz. The frequency of oscillator LO1 is set as $f_{LO1} = f_{LO2} + f_{Rx} = 450 + 950 = 1400$ MHz. Hence, image rejection mixer 210 outputs a demodulating signal having a frequency $f_{Rx} = f_{LO1} - f_{LO2} = 1400 - 450 = 950$ MHz as two 90° offset outputs to quadrature down converter 230. Next, in the DCS band, consider a receive signal having a frequency of 1808 MHz. The frequency of oscillator LO2 is fixed at $f_{LO2} = 475$ MHz. The frequency of oscillator LO1 is set as $f_{LO1} = f_{Rx} - f_{LO2} = 1808 - 475 = 1333$ MHz. Hence, image rejection mixer 210 outputs a demodulating signal having a frequency $f_{Rx} = f_{LO1} + f_{LO2} = 1333 + 475 = 1808$ MHz as two 90° offset outputs to quadrature down converter 230.

The operation of image rejection mixer 210 is described in more detail with reference to FIG. 6. Image rejection mixer 210 includes two ninety-degree phase shifters 211, 212; four mixers 213, 214, 215 and 216; and two summers 217 and 218. Mixer 210 receives input signals from oscillators LO1 and LO2, with the LO1 signal being input to phase shifter 211, and the LO2 signal being input to phase shifter 212. Depending on whether summers 217 and 218 are set to perform an addition or subtraction operation, the image reject mixer combines the signals from LO1 and LO2 to produce a signal having a frequency which is either the sum or difference of the two LO frequencies, and suppresses the signal having a frequency which is the other of the sum or difference of the LO frequencies.

The mixing process employed by mixers 213–216 is analogous to the multiplication of two sine waves in the time domain. Because the mixing process is a nonlinear operation, many mixing products are produced (i.e. first order products, third order products, etc.). The first order mixing products, which comprise the signals at the sum and difference of the mixer input frequencies, are of interest to the present application. Depending on which GSM band is selected, image reject mixer 210 suppresses one of the first order products (either the sum or the difference) and outputs the other of the first order products to quadrature down converter 230.

Hence, each of mixers 213–216 produces a desired sideband signal at the receive frequency and an undesired sideband signal. Ninety-degree phase shifters 211 and 212 are situated to cause the sum sidebands to show up at summers 217 and 218 in-phase and the difference sidebands to show up at summers 217 and 218 180° out-of-phase. Hence, if summers 217, 218 are set to output a sum, the in-phase (sum) sidebands will add to produce an output signal at the receive frequency, while the 180° out-of-phase (difference) side bands at the image frequency will cancel each other out. Conversely, if summers 217, 218 are set to output a difference, the difference of the 180° out-of-phase sidebands will produce an output signal at the receive frequency, while the in-phase sidebands at the image frequency will cancel each other out.

Phase shifters 211 and 212 split the incoming oscillator signals into two signals of substantially equal amplitude (without changing frequency) having a relative phase displacement of 90°. Phase shifter 211 receives the signal from oscillator LO1 and outputs an in-phase signal to mixers 213 and 214 and a 90° out-of-phase signal to mixers 215 and 216, both at frequency $f_{LO1}$. Phase shifter 212 receives the signal from oscillator LO2 and outputs an in-phase signal to mixers 214 and 216 and a 90° out-of-phase signal to mixers 213 and 215, both at frequency $f_{LO2}$.

The output signal from mixers 213 and 214 is input to summer 217, and the output signal from mixers 215 and 216 is input to summer 218. Each of the mixers outputs an in-phase first order sideband signal having a frequency $f_{LO1}+f_{LO2}$ and a 180° out-of-phase first order sideband signal having a frequency $f_{LO1}-f_{LO2}$. For GSM, the signal at the difference frequency is output and the signal at the sum frequency is suppressed by setting summers 217 and 218 to perform a difference operation. For DCS, the sum frequency is output as the receive frequency and the difference frequency is suppressed by setting summers 217 and 218 to perform a summing operation. Moreover, due to the configuration of mixers 213–216 and phase shifters 211 and 212, the demodulating signals output by summers 217 and 218 are themselves 90° out-of-phase.

Alternative phase shifter/mixer configurations are possible to achieve the same result. Phase shifter 211, for example, could supply an in-phase signal to mixers 213 and 215 and a phase-displaced signal to mixers 214 and 216, while phase shifter 212 could supply an in-phase signal to mixers 215 and 216 and a phase-displaced signal to mixers 213 and 214.

The receiver architecture of the present invention is an "offset local oscillator (LO) direct down conversion" architecture. In conventional direct down conversion receivers, the local oscillator is placed at the exact frequency of the received signal, and the frequency of the received signal is down-converted to the baseband frequency in one step. Self-interference or leakage is a common problem associated with such receivers. Since the local oscillator operates directly on the receive frequency, the receiver may receive its own LO signal and there may be spurious radiation of the LO signal to the LNA input unless the LO is extremely isolated. The offset LO direct down conversion receiver of the present invention, conversely, mixes two offset frequency LOs (LO1 and LO2) to create a demodulating signal at the receive frequency. By situating image reject mixer 210, which mixes the two LO signals, very close to down converter 230, the demodulating frequency exists only in a very confined area. The offset LOs may be situated elsewhere on the IC or even external to the IC to eliminate signal leakage problems. Relative to conventional direct down conversion architectures, the inventive offset LO direct down conversion architecture superior LO suppression performance. Moreover, use of bulky and costly bandpass filters that are required in heterodyne and super-heterodyne architectures is avoided.

Referring again to FIG. 5, transmitter 250 has a translation loop architecture and comprises quadrature mixer 260, VCO block 270, a mixer or down converter 280, dividers 282 and 284 and phase detector/loop filter 290. Analog voice signals captured by microphone 114 for transmission are converted to a digital signal stream and processed into baseband "I" and "Q" signals by DSP 102. The digital baseband "I" and "Q" signals are converted into analog "I" and "Q" signals by DAC 109 and are input to quadrature mixer 260. Quadrature mixer 260 mixes the "I" and "Q" signals with ninety-degree phase-displaced intermediate frequency (IF) signals from mixer 280 and sums the resulting signals to generate a modulated signal at the IF frequency $f_{IF}$. Mixer 280 produces the IF signal by mixing a signal from VCO 270 at the transmit frequency $f_{Tx}$ with the signal from local oscillator LO1. Divider block 282 divides the output of quadrature mixer 260 down to the comparison frequency $f_{CF}$ for input to phase detector 290, and divider block 284 divides the signal from oscillator LO2 down to $f_{CF}$ for input to phase detector 290. Phase detector 290 adjusts the phase of VCO 270 as necessary to correct any detected phase differences. A modulated signal is output by VCO block 270 to antenna 116 for transmission.

Transmitter 250 is now described in more detail with reference to FIG. 6. VCO block 270 comprises two VCOs 272 and 274. VCO 272 has a bandwidth corresponding to the GSM transmit band of 880–915 MHz. VCO 274 has a bandwidth corresponding to the DCS transmit band of 1710–1785 MHz. Only one of VCOs 272, 274, depending on the GSM band selected, is active. A fixed frequency relation exists between the transmit and receive frequency bands that can be expressed as:

$$f_{Tx}=f_{Rx}-f_{CF} \qquad \text{(equation 3)}.$$

The comparison frequency, $f_{CF}$ is a constant 45 MHz for GSM and 95 MHz for DCS. Substituting equations 1 and 2 from the receiver side into equation 3 yields the following important relations:

$$f_{Tx}=f_{LO1}-f_{LO2}-f_{CF}\text{(GSM)} \qquad \text{(equation 4)};$$

and $$f_{Tx}=f_{LO1}+f_{LO2}-f_{CF}\text{(DCS)} \qquad \text{(equation 5)}.$$

Since both the receive and transmit frequencies can be expressed in terms of the LO1, LO2 and comparison frequencies it is possible to receive and transmit simultaneously without changing the frequencies of local oscillators LO1 and LO2. Hence, transceiver 110 may be employed in a type 2 mobile station in which simultaneous transmission and reception within the same TDMA time slot (multi-slot operation) is required.

Combiner or switch 276 selects the active one of VCOs 272 and 274 and supplies the transmit signal at frequency $f_{Tx}$ to mixer 280. Mixer 280 produces an IF signal having a frequency $f_{IF}$ by mixing transmit signal from the VCO with the signal from oscillator LO1. In GSM, mixer 280 operates in "high side injection" mode. That is, the frequency of the local oscillator signal is higher than that of the transmit signal. The IF frequency can be expressed as:

$$f_{IF}=f_{LO1}-f_{Tx}\text{(GMS)} \qquad \text{(equation 6)}.$$

In DCS, mixer 280 operates in "low side injection" mode; the frequency of the local oscillator signal is lower than that of the transmit signal. The IF frequency can be expressed as:

$$f_{IF}=f_{Tx}-f_{LO1}\text{(DCS)} \qquad \text{(equation 7)}.$$

Substituting equations 4 and 5 into equations 6 and 7, it can be seen that the intermediate frequency is a constant derived from the LO2 and comparison frequencies:

$$f_{IF}=f_{LO2}+f_{CF}=450+45=495 \text{ MHz (GSM)} \quad \text{(equation 8);}$$

and $$f_{IF}=f_{LO2}-f_{CF}=475-95=380 \text{ MHz (DCS)} \quad \text{(equation 9).}$$

Quadrature mixer 260 comprises two mixers 262 and 264, a 90° phase shifter 266 and a summer 268. Phase shifter 266 splits the IF signal from mixer 280 into two 90° phase-displaced signals. Mixer or "I" modulator 262 mixes the "I" modulating signal with the 0° IF signal, and mixer or "Q" modulator 264 mixes the "Q" modulating signal with the 90° IF signal. Summer 268 combines the output signals from mixers 262 and 264 to form a modulated IF signal having both "I" and "Q" components.

The modulation introduced by quadrature mixer 260 is not translated forward in the loop to phase dector 290, but rather, is translated back in the loop to the transmit VCOs This is best understood by considering, in turn, the input and output sides of quadrature mixer 260. Looking at the input side of quadrature mixer 2600, the transmit signals produced by VCOs 272 and 274, of course, must be modulated with the "I" and "Q" information. Since mixer 280 simply down converts the transmit signal and oscillator LO1 signal to a signal at the IF frequency, its output signal (which is input to quadrature mixer 260) must also be modulated. On the output side of quadrature mixer 260, by contrast, phase detector 290 has one unmodulated input (the frequency-divided signal from oscillator LO2) which, in turn, forces its other input to be unmodulated (equal). Hence, the output from summer 268 of modulator 268 must be unmodulated. Effectively, the loop forces translation of the modulating "I" and "Q" signals back to the transmit VCOs, and subtraction of the modulation from the quadrature mixer output.

Phase detector 290 compares the phase of the unmodulated signal at the intermediate frequency $f_{IF}$ from quadrature mixer 260 with the phase of the unmodulated signal from oscillator LO2. Before comparison by detector 290, the signals are first divided down to the comparison frequency $f_{CF}$. Recall that the comparison frequency is also the difference between the transmit and receive frequencies. Divider 284 divides the LO2 frequency $f_{LO2}$ by an integer N to generate the comparison frequency $f_{CF}$, and divider 282 divides the IF frequency $f_{IF}$ by an integer M to generate the comparison frequency $f_{CF}$. Dividers 282 and 284 may be implemented using counters, shift registers, or through other methods familiar to those of ordinary skill in the art.

The frequency relationships are expressed as:

$$f_{LO2}=N \cdot f_{CF} \quad \text{(equation 10);}$$

and $$f_{IF}=M \cdot f_{CF} \quad \text{(equation 11).}$$

Substituting equations 8 and 9 into equations 10 and 11 yields:

$$f_{IF}=(N+1)f_{CF} \text{(GSM)} \quad \text{(equation 12);}$$

and $$f_{IF}=(N-1)f_{CF} \text{(DCS)} \quad \text{(equation 13).}$$

Hence, M=N+1 for GSM and M=N−1 for DCS. For GSM, $f_{CF}$=45 MHz; $f_{LO2}$=450 MHz; $f_{IF}$=495 MHz; N=10 and M=11. For DCS, $f_{CF}$=95 MHz; $f_{LO2}$=475 MHz; $f_{IF}$=380 MHz; N=5 and M=4.

Based on the comparison of the signal phases, detector 290 generates an appropriate output signal. If the phases of the two signals are aligned, the loop is "locked". No adjustment voltage is asserted and VCOs 272, 274 continue to oscillate at the same frequency. If one signal leads or lags the other, phase detector 290 outputs a pulse proportional to the phase difference between the two signals. The output pulses are commonly referred to as "UP" or DOWN signals and typically have a width or duration corresponding to any phase difference between the detector input signals.

Charge pump/loop filter block 292 includes a charge pump and a loop filter. The charge pump, based on the signal received from detector 290, generates a current that adjusts the transmit frequency of VCOs 272, 274. The charge pump current is increased or decreases as necessary to correct phase leads or lags. If the loop is locked, the charge pump current is neither increased nor decreased to compensate for phase errors. The loop filter 16 develops a control voltage from the charge pump current and applies it to VCOs 272, 274. A common configuration for a loop filter is a simple single-pole, low-pass filter that can be realized with a single resistor and capacitor. Oscillators 272, 274 oscillate about a specific transmit frequency channel (45 or 95 MHz less than the receive frequency channel) that is adjusted as necessary by the control voltage applied by the loop filter. The bandwidth of the transmit frequency channel is typically 200 kHz.

Figure 7:
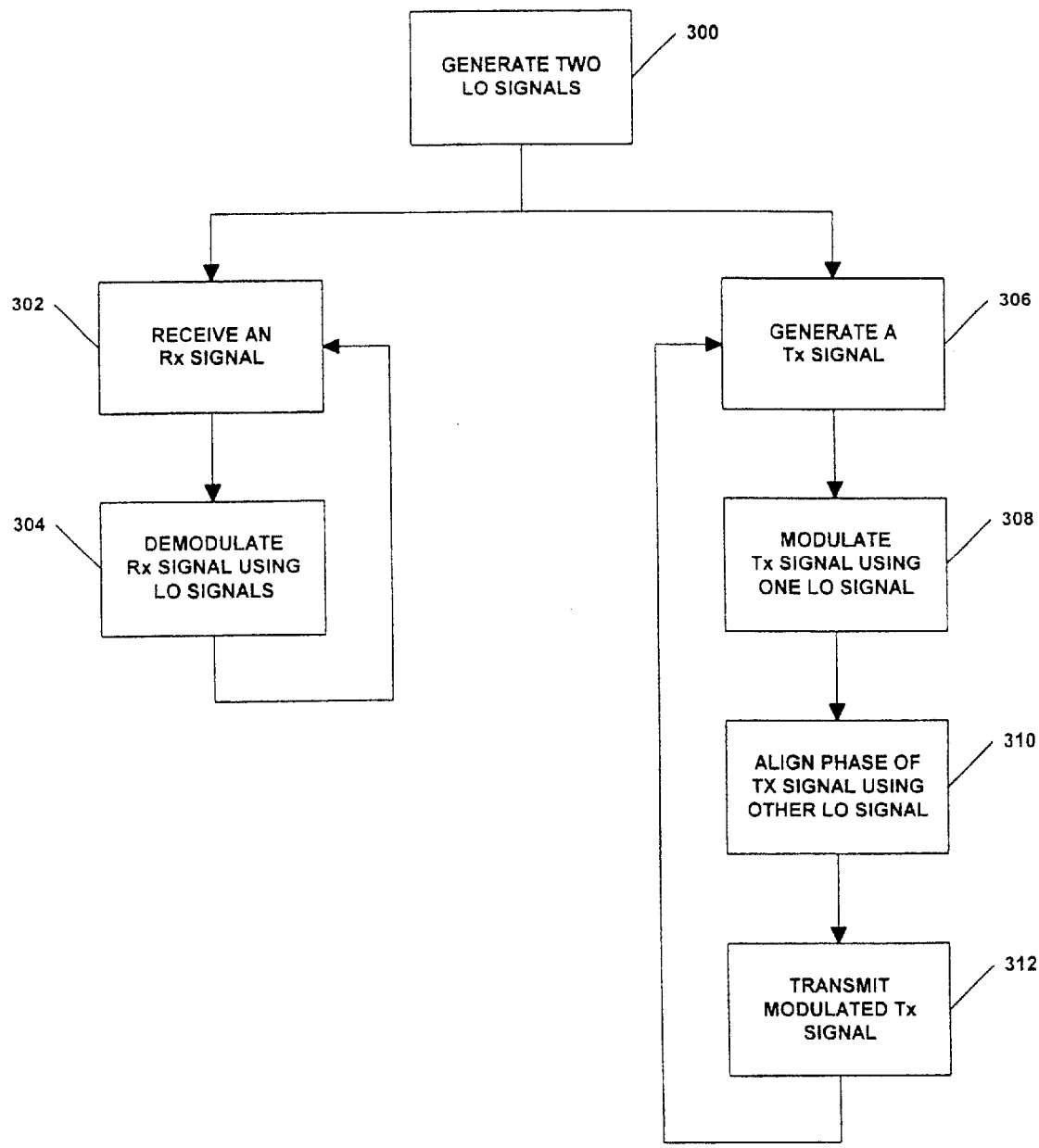
FIG. 7 is a flowchart illustrating a method of simultaneous reception and transmission according to the present invention.

FIG. 7 is a flowchart depicting a method for simultaneously transmitting and receiving signals in accordance with the present invention. In step 300, two local oscillation signals LO1 and LO2 are generated. A signal Rx is received in step 302 and demodulated with the LO signals in step 304. In step 306, a transmit signal Tx is generated. The transmit signal is modulated using one of the LO signals (step 308) and the phase of the transmit signal is aligned using the other of the LO signals (step 310). Finally, in step 312, the modulated Tx signal is transmitted. Receiving steps 302–304 are performed repetitively and simultaneously with transmitting steps 306–308–310–312 without changing the frequencies of either of the LO signals.

Figure 8:
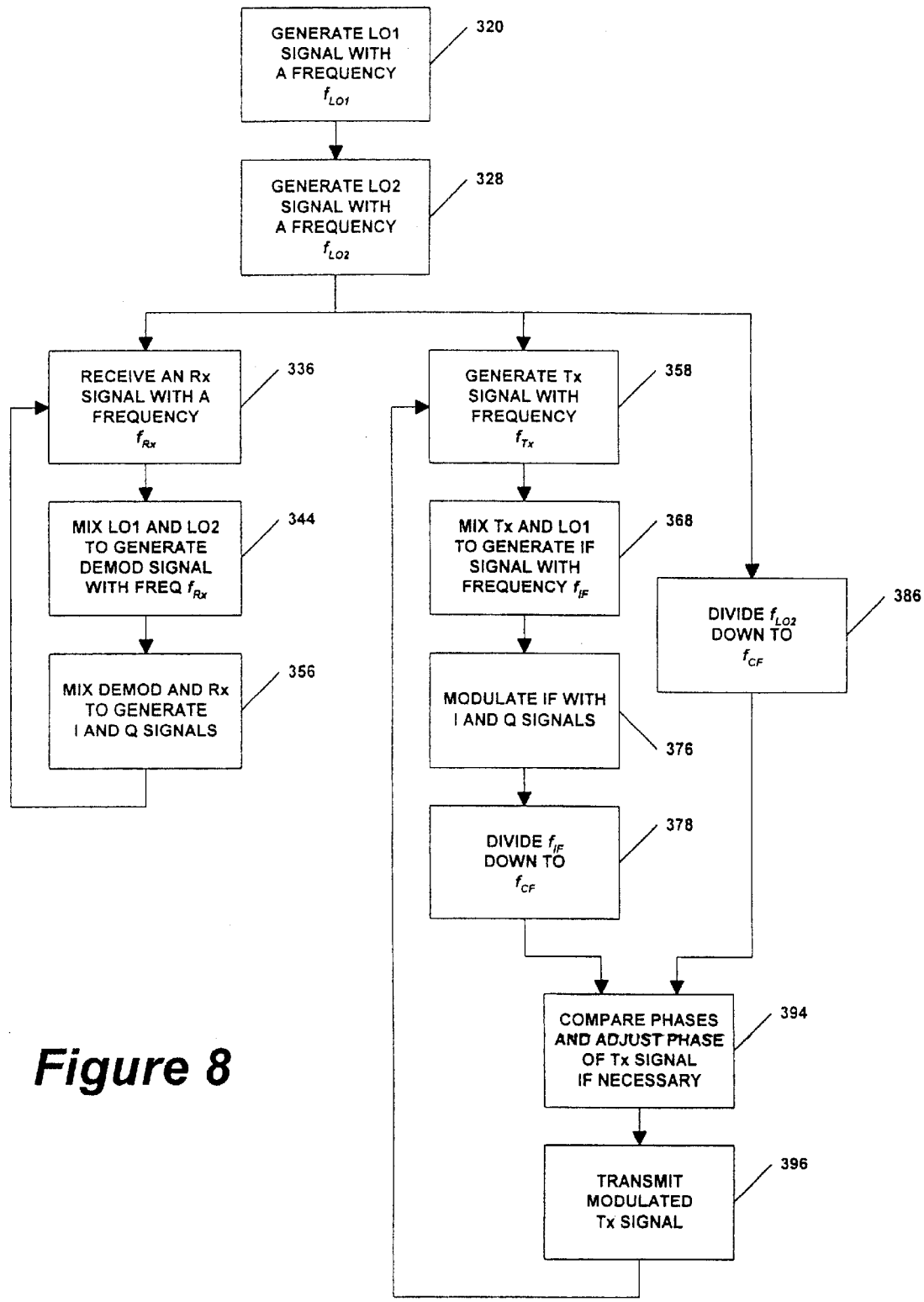
FIG. 8 is a flowchart illustrating in more detail a method of simultaneous reception and transmission according to the present invention.

FIG. 8 is another flowchart depicting in greater detail a method for transmitting and receiving signals within the same time slot of a TDMA frame. FIGS. 8a–8h depict in greater detail those method steps that are dependent on which frequency band is selected. In a multi-band implementation, a frequency band is first selected. If the GSM band is selected, the receive bandwidth is 925–960 MHz and the transmit bandwidth is 880–915 MHz. If the DCS band is selected, the receive bandwidth is 1805–1880 MHz and the transmit bandwidth is 1710–1785 MHz.

Figure 8A:
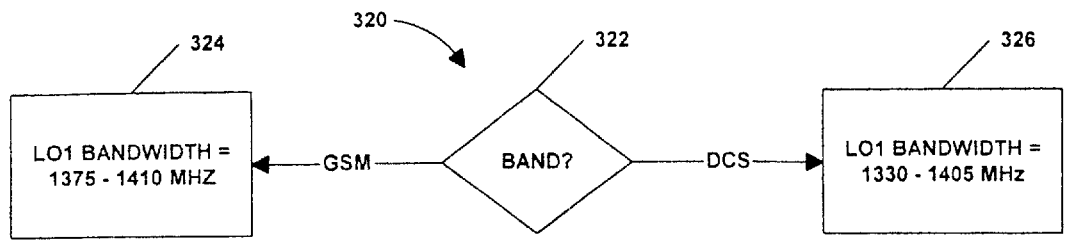
FIGS. 8a–8h are flowcharts illustrating in more detail aspects of the flowchart of FIG. 8 relating to multiple band use.
Figure 8B:
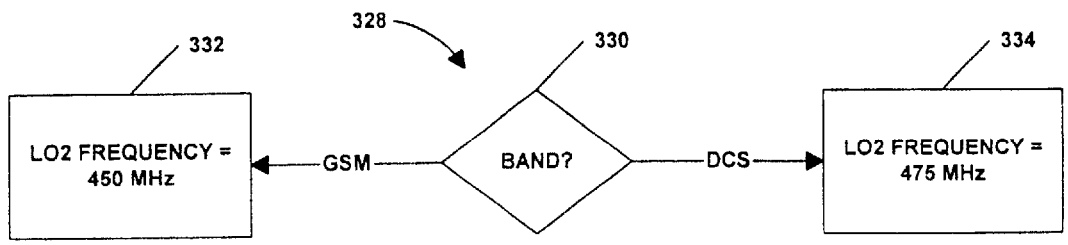

In step 320, a first local oscillation signal LO1 having a frequency $f_{LO1}$ is generated. In a dual band implementation, as shown in FIG. 8a, if the selected band is GSM, the frequency of the LO1 signal is within a bandwidth of 1375–1410 MHz (step 324). If the selected band is DCS, the frequency of the LO1 signal is within a bandwidth of 1330–1405 MHz (step 326). In step 328, a second local oscillation signal LO2 having a frequency $f_{LO2}$ is generated. In a dual band implementation (FIG. 8b), if GSM is selected, LO2 has a frequency of 450 MHz (step 332), and if DCS is selected, LO2 has a frequency of 475 MHz (step 334).

Figure 8C:
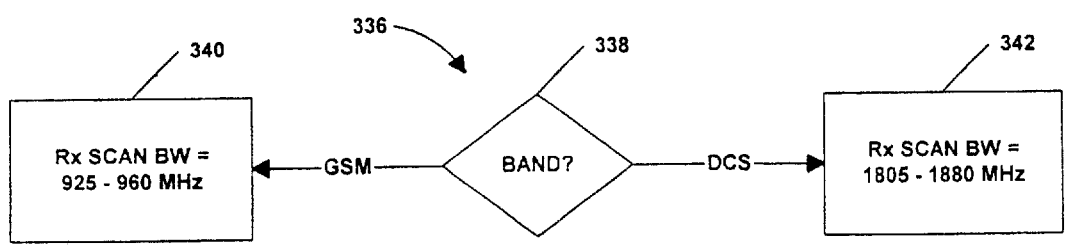
Figure 8D:
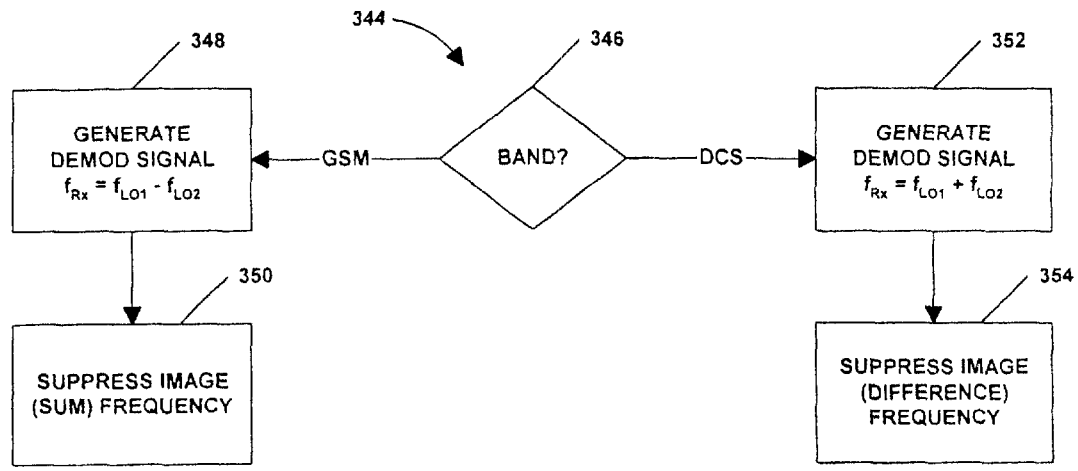

Having established LO1 and LO2 signals, simultaneous transmission and reception within the same time slot of a TDMA frame proceeds. The steps relating to receiving a signal are first described. In step 336, a receive signal having a frequency $f_{Rx}$ is received. In a dual band implementation, as shown in FIG. 8c, the receive signal will be within a bandwidth of 925–960 MHz for GSM (step 340) or within a bandwidth of 1805–1880 MHz for DCS (step 342). In step 344, signals LO1 and LO2 are mixed to generate a demodulating signal having a frequency $f_{Rx}$. In a dual band implementation, step 344 proceeds as shown in FIG. 8d. Mixing signals LO1 and LO2 creates a difference frequency $f_{Rx}=f_{LO1}-f_{LO2}$ and a sum frequency $f_{Rx}=f_{LO1}+f_{LO2}$. For the GSM band, the demodulating signal is the difference frequency (step 348) and the sum frequency is suppressed (step 350). For the GSM band, conversely, the demodulating signal is the sum frequency (step 352) and the difference frequency is suppressed (step 354). Finally, in step 356, the demodulating signal and the receive signal are mixed to generate baseband "I" and "Q" signals.

Figure 8E:
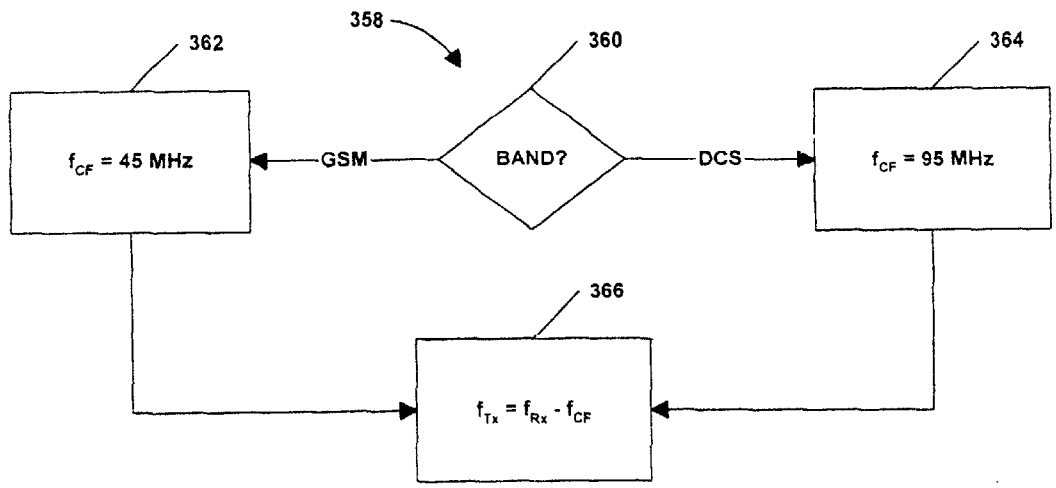
Figure 8F:
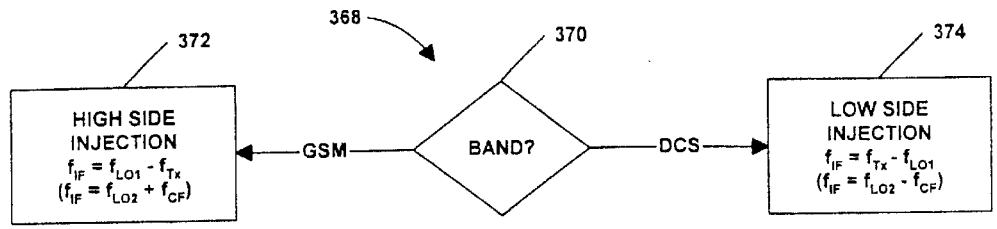
Figure 8G:
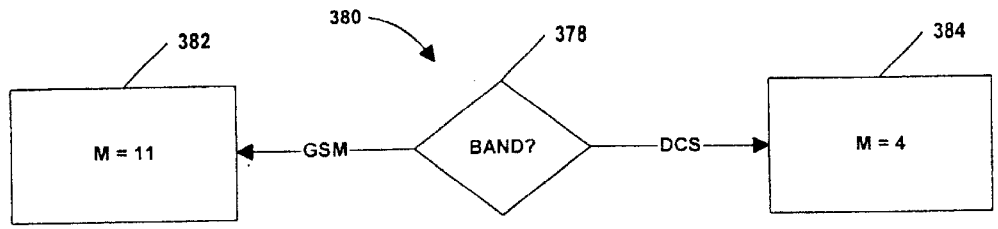
Figure 8H:
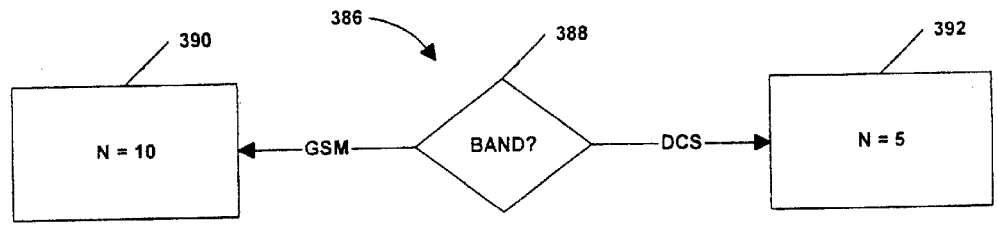

The steps involved in transmitting a signal are now described. Again, these steps are performed simultaneously with the steps involved in receiving a signal. In step 358, a transmit signal having a frequency $f_{Tx}$ is generated. FIG. 8e shows the considerations for a dual band implementation. Regardless of the band, the transmit frequency is equal to the receive frequency minus a comparison frequency (step 366). In GSM $f_{CF}=45$ MHz (step 362) and in DCS $f_{CF}=95$ MHz (step 364). In step 368, the transmit signal and the LO1 signal are mixed to generate an IF signal having a frequency $f_{IF}$. In a dual band implementation (FIG. 8f), $f_{IF}=f_{LO1}-f_{Tx}$ if GSM is selected (step 372) and $f_{IF}=f_{Tx}-f_{LO1}$ if DCS is selected (step 374). Moreover, $f_{IF}=f_{LO2}+f_{CF}$ if GSM is selected and $f_{IF}=f_{LO2}-f_{CF}$ if DCS is selected. In step 376, the IF signal is modulated with baseband "I" and "Q" signals. This modulation is translated back to the generated transmit signal. The frequency of the IF signal is then divided by an integer M down to the comparison frequency $f_{CF}$ (step 380). In a dual band implementation (FIG. 8g), M=11 for GSM (step 382) and M=4 for DCS (step 384). The frequency of the LO2 signal is also divided down to the comparison frequency by an integer N (step 386). In a dual band implementation (FIG. 8h), N=10 in GSM (step 390) and N=5 in DCS (step 392). In step 394, the phases of the divided IF and LO2 signals are compared and, if necessary, the frequency of the transmit signal is adjusted. Finally, in step 396, the modulated transmit signal is transmitted.

The use of a comparison frequency at phase detector 290 that is exactly the difference between the receive and transmit frequencies is of fundamental importance to the present invention. It permits use of the same local oscillator frequencies in both receive and transmit mode, thereby permitting simultaneous transmission and reception. FIG. 9 is a table that summarizes the various frequency relationships for the GSM and DCS frequency bands. In summary, the receive frequency is either the difference (GSM) or sum (DCS) of the LO1 and LO2 frequencies. The transmit frequency is the difference of the receive frequency and the comparison frequency. The input to divider 284 is the LO2 frequency, and the input to divider 282 is an IF frequency that is either one comparison frequency higher (GSM) or lower (DCS) than the LO2 frequency. The IF frequency, in turn, is equal to either the LO1 frequency minus the transmit frequency (GSM), or to the transmit frequency minus the LO1 frequency (DCS).

While particular embodiments of the present invention have been described above, it should be understood that they have been presented by way of example only, and not as limitations. The breadth and scope of the present invention is defined by the following claims and their equivalents, and is not limited by the particular embodiments described herein.

What is claimed is:

1. A transceiver having simultaneous transmission and reception capability comprising:

a first local oscillator LO1 that generates a signal having a frequency $f_{LO1}$;

a second local oscillator LO2 that generates a signal having a frequency $f_{LO2}$;

a receiver that receives a receive signal having a frequency $f_{Rx}$, wherein $f_{Rx}$ is one of the sum or the difference of frequencies $f_{LO1}$ and $f_{LO2}$, the receiver comprising an image rejection mixer that mixes frequencies $f_{LO1}$ and $f_{LO2}$ to generate a demodulating signal at the receive frequency $f_{Rx}$, and a quadrature down converter that mixes the demodulating signal with the receive signal to produce baseband "I" and "Q" signals; and a transmitter that transmits a transmit signal having a frequency $f_{Tx}$, wherein $f_{Tx}$ is equal to $f_{Rx}$ minus a comparison frequency $f_{CF}$, the transmitter comprising a voltage-controlled oscillator (VCO) that generates the transmit signal, a mixer that mixes the transmit signal with the signal from the first local oscillator LO1 to produce an IF signal having a frequency $f_{IF}$, a quadrature mixer that modulates the IF signal with baseband "I" and "Q" signals, a first divider that divides $f_{IF}$ by an integer M down to $f_{CF}$, a second divider that divides $f_{LO2}$ by an integer N down to $f_{CF}$, and a phase detector that compares the phases of the signals output by the first and second dividers and outputs a control voltage to the VCO.

2. A transceiver as claimed in claim 1, wherein $f_{LO1}$ is variable in relation to $f_{Rx}$ and $f_{LO2}$ is fixed.

3. A transceiver as claimed in claim 2, wherein the receive and transmit signals are from one of first and second frequency bands, and wherein the image rejection mixer generates a demodulating signal having a frequency $f_{Rx}=f_{LO1}-f_{LO2}$ for receive signals in the first frequency band or a demodulating signal having a frequency $f_{Rx}=f_{LO1}+f_{LO2}$ for receive signals in the second frequency band.

4. A transceiver as claimed in claim 3, wherein the first frequency band is GSM and has a receive bandwidth of 925–960 MHz and a transmit bandwidth of 880–915 MHz, and the second frequency band is DCS and has a receive bandwidth of 1805–1880 MHz and a transmit bandwidth of 1710–1785 MHz.

5. A transceiver as claimed in claim 4, wherein local oscillator LO1 has a bandwidth of 1375–1410 MHz in GSM and a bandwidth of 1330–1405 MHz in DCS.

6. A transceiver as claimed in claim 5, wherein local oscillator LO2 has a fixed frequency of 450 MHz in GSM and a fixed frequency of 475 MHz in DCS.

7. A transceiver as claimed in claim 3, wherein the transmitter mixer generates an IF signal having a frequency $f_{IF}=f_{LO2}+f_{CF}$ for transmit signals in the first frequency band or an IF signal having a frequency $f_{IF}=f_{LO2}-f_{CF}$ for transmit signals in the second frequency band.

8. A transceiver as claimed in claim 7, wherein $f_{CF}=45$ MHz for transmit signals in the first frequency band and $f_{CF}=95$ MHz for transmit signals in the second frequency band.

9. A transceiver as claimed in claim 7, wherein $f_{IF}=495$ MHz for transmit signals in the first frequency band and $f_{IF}=380$ MHz for transmit signals in the second frequency band.

10. A transceiver as claimed in claim 3, wherein the first divider divides $f_{IF}$ by an integer M=N+1 for transmit signals in the first frequency band and by an integer M=N-1 for transmit signals in the second frequency band.

11. A transceiver as claimed in claim 10, wherein N=10 for signals in the first frequency band and N=5 for signals in the second frequency band.

12. A transceiver as claimed in claim 3, wherein the image rejection mixer comprises:

first and second phase shifters and first, second, third and fourth mixers, wherein the first phase shifter receives a signal from oscillator LO1 and outputs an in-phase signal to the first and second mixers and a 90° phase-displaced signal to the third and fourth mixers, and the second phase shifter receives a signal from oscillator LO2 and outputs an in-phase signal to the second and fourth mixers and a 90° phase-displaced signal to the first and third mixers; and first and second combiners that may be set to perform a difference or a summing operation, wherein the first combiner receives inputs from the first and second mixers and outputs a demodulating signal, and wherein the second combiner receives inputs from the third and fourth mixers and outputs a 90° phase-displaced demodulating signal.

13. A transceiver as claimed in claim 12, wherein the quadrature downconverter comprises an "I" demodulator and a "Q" demodulator, and wherein the "I" demodulator receives the receive signal and the demodulating signal from the first combiner of the image rejection mixer, and wherein the "Q" demodulator receives the receive signal and the 90° phase-displaced signal from the second combiner.

14. A transceiver as claimed in claim 1, wherein the receiver further comprises at least one low noise amplifier that amplifies the receive signal before it is supplied to the quadrature down converter.

15. A transceiver as claimed in claim 1, wherein the receiver further comprises a baseband gain and filter chain for filtering and amplifying the baseband "I" and "Q" signals generated by the quadrature down converter.

16. A transceiver as claimed in claim 3, wherein the quadrature mixer comprises a phase shifter, and "I" and "Q" modulators, and wherein the phase shifter splits the IF signal into an in-phase signal that is supplied to the "I" modulator and a 90° phase-displaced signal that is supplied to the "Q" modulator.

17. A transceiver as claimed in claim 3, and further comprising another VCO for generating transmit signals in the second frequency band, and a switch for selecting between the two VCOs.

18. A transceiver as claimed in claim 3, and further comprising a charge pump coupled to the phase detector that generates a control current based on the control voltage output by the phase detector, and a loop filter that receives the control current and develops a control signal that is applied to the VCO.

19. A multi-band transceiver for receiving and transmitting signals within a selected one of at least two frequency bands, transmission and reception occurring simultaneously and within the same time slot of a TDMA frame, the transceiver comprising:

a first local oscillator LO1 that selectively oscillates within a bandwidth corresponding to the selected frequency band and outputs a signal having a frequency $f_{LO1}$;

a second local oscillator LO2 that selectively oscillates at a frequency corresponding to the selected frequency band and outputs a signal having a frequency $f_{LO2}$;

a receiver that receives a receive signal having a frequency $f_{Rx}$ and mixes the signals from the first and second local oscillators to generate a demodulating signal having a frequency $f_{Rx}$, wherein $f_{Rx}=f_{LO1}\pm f_{LO2}$; and a transmitter having a loop architecture and comprising a VCO that generates a transmit signal having a transmit frequency $f_{Tx}$ equal to $f_{Rx}$ minus a comparison frequency $f_{CF}$, a mixer that mixes the signal from the first local oscillator with the transmit signal to generate an IF signal having a frequency $f_{IF}=f_{LO2}\pm f_{CF}$, a quadrature mixer that modulates the IF signal with baseband "I" and "Q" signals, and a phase detector that compares the phases of the IF signal and the signal from the second local oscillator and outputs a control voltage to the VCO.

20. A multi-band transceiver as claimed in claim 19, and further comprising a first divider coupled between the quadrature mixer and phase detector that divides the frequency of the IF signal by an integer M, and a second divider coupled between oscillator LO2 and the phase detector that divides the frequency of the LO2 signal by an integer N.

21. A multi-band transceiver as claimed in claim 20, wherein N=M±1.

22. A method for simultaneously transmitting and receiving signals comprising the following steps:

(a) generating two local oscillation (LO) signals with two local oscillators;
(b) receiving a receive signal;
(c) demodulating the receive signal by simultaneously using the two LO signals;
(d) generating a transmit signal;
(e) modulating the transmit signal using one of the LO signals;
(f) aligning the phase of the transmit signal using the other of the LO signals; and
(g) transmitting the modulated transmit signal, wherein receive steps (b)–(c) are performed repetitively and simultaneously with transmit steps (d)–(g).

23. A method as claimed in claim 22, wherein:

in step (a), a first local oscillation signal LO1 having a frequency $f_{LO1}$ and a second local oscillation signal having a frequency $f_{LO2}$ are generated;
in step (b), the receive signal has a frequency $f_{Rx}$; and
in step (c), a demodulating signal having a frequency $f_{Rx}=f_{LO1}\pm f_{LO2}$ is generated.

24. A method as claimed in claim 23, wherein:

in step (d), the transmit signal has a frequency $f_{Tx}=f_{Rx}-f_{CF}$, wherein $f_{CF}$ is a constant comparison frequency.

25. A method as claimed in claim 24, wherein:

in step (e), an IF signal having a frequency $f_{IF}=f_{LO1}-f_{Tx}$ or $f_{IF}=f_{Tx}-f_{LO1}$ is generated by mixing the transmit signal and the LO1 signal, and the IF signal is modulated with baseband "I" and "Q" modulation.

26. A method as claimed in claim 25, wherein:

in step (f), $f_{IF}$ is divided by an integer M to generate a signal at the comparison frequency $f_{CF}$, and $f_{LO2}$ is divided by an integer N=M±1 to generate another signal at the comparison frequency $f_{CF}$, and the phases of the two signals at the comparison frequency are compared.

27. A method for simultaneously transmitting and receiving signals comprising the following steps:

(a) generating a first local oscillation signal LO1 having a frequency $f_{LO1}$;
(b) generating a second local oscillation signal LO2 having a frequency $f_{LO2}$;
(c) receiving a receive signal having a frequency $f_{Rx}$;
(d) mixing signals LO1 and LO2 to generate a demodulating signal having a frequency $f_{Rx}$;

(e) mixing the demodulating signal and the receive signal to generate baseband "I" and "Q" signals;

(f) generating a transmit signal having a frequency $f_{Tx}$;

(g) mixing the transmit signal and the LO1 signal to generate an IF signal having a frequency $f_{IF}$;

(h) modulating the IF signal with baseband "I" and "Q" signals;

(i) dividing the frequency of the IF signal $f_{IF}$ down to a comparison frequency $f_{CF}$;

(j) dividing the frequency of the LO2 signal $f_{LO2}$ down to the comparison frequency $f_{CF}$;

(k) comparing the phases of the divided IF and LO2 signals and adjusting the frequency of the transmit signal if necessary; and (l) transmitting the modulated transmit signal, wherein receive steps (c)–(e) and transmit steps (f)–(l) are performed within the same time slot of a TDMA frame.

28. A method as claimed in claim 27, and further comprising the step of selecting a frequency band for transmission and reception.

29. A method as claimed in claim 28, wherein the frequency band is selecting from the group consisting of GSM, having a receive bandwidth of 925–960 MHz and a transmit bandwidth of 880–915 MHz, and DCS, having a receive bandwidth of 1805–1880 MHz and a transmit bandwidth of 1710–1785 MHz.

30. A method as claimed in claim 29, wherein in step (a), if GSM is selected, LO1 is within a frequency band of 1375–1410 MHz, and if DCS is selected, LO1 is within a frequency band of 1330–1405 MHz.

31. A method as claimed in claim 29, wherein in step (b), if GSM is selected, LO2 has a frequency of 450 MHz, and if DCS is selected, LO2 has a frequency of 475 MHz.

32. A method as claimed in claim 29, wherein in step (d), mixing signals LO1 and LO2 creates a difference frequency $f_{Rx}=f_{LO1}-f_{LO2}$ and a sum frequency $f_{Rx}=f_{LO1}+f_{LO2}$, and wherein if GSM is selected, the demodulating signal is the difference frequency and the sum frequency is suppressed, and if DCS is selected, the demodulating signal is the sum frequency and the difference frequency is suppressed.

33. A method as claimed in claim 29, wherein in step (f), the transmit signal has a frequency $f_{Tx}=f_{Rx}-f_{CF}$, wherein $f_{CF}=45$ MHz if GSM is selected and $f_{CF}=95$ MHz if DCS is selected.

34. A method as claimed in claim 29, wherein in step (g), $f_{IF}=f_{LO1}-f_{Tx}$ if GSM is selected and $f_{IF}=f_{Tx}-f_{LO1}$ if DCS is selected.

35. A method as claimed in claim 34, wherein $f_{IF}=f_{LO2}+f_{CF}$ if GSM is selected and $f_{IF}=f_{LO2}-f_{CF}$ if DCS is selected.

36. A method as claimed in claim 29, wherein in step (i), the frequency of the IF signal is divided by 11 if GSM is selected and is divided by 4 if DCS is selected.

37. A method as claimed in claim 29, wherein in step (j), the frequency of the LO2 signal is divided by 10 if GSM is selected and is divided by 5 if DCS is selected.

38. A wireless handset comprising a transceiver as claimed in claim 1.

39. A wireless handset comprising a transceiver as claimed in claim 19.

* * * * *